H. R. HUGHES.
DEMOUNTABLE CUTTING EDGE FOR DRILLING TOOLS.
APPLICATION FILED MAY 2, 1914.
1,143,275.
Patented June 15, 1915.
2 SHEETS—SHEET 1.
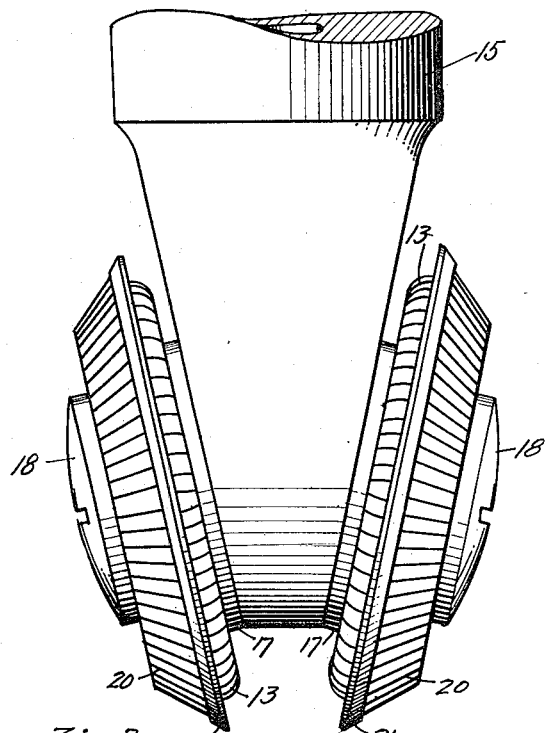
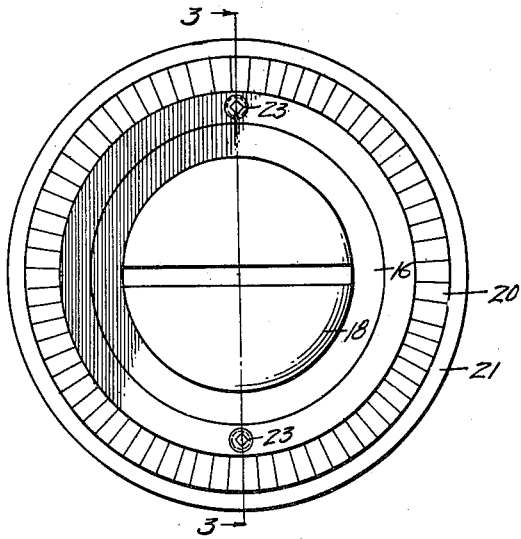
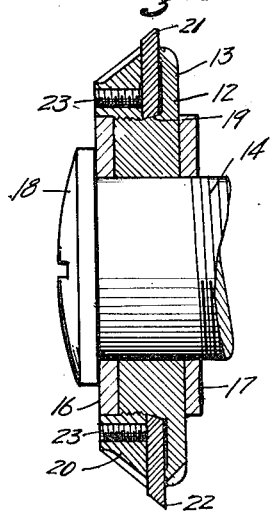
Witnesses:
James M. Abbett
Marguerite Bates
Inventor.
Howard R. Hughes.
By
Attys.

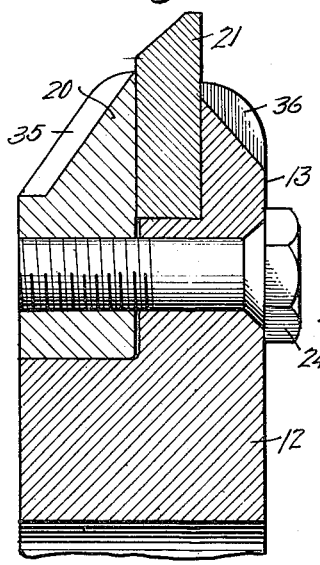
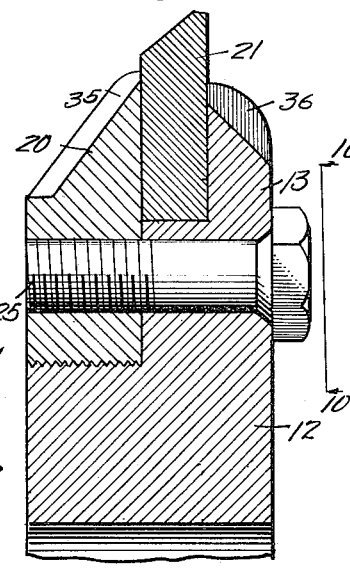
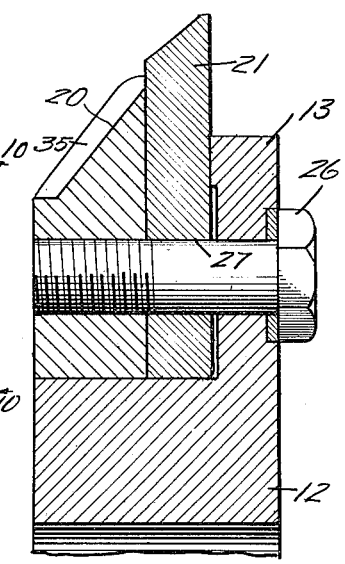
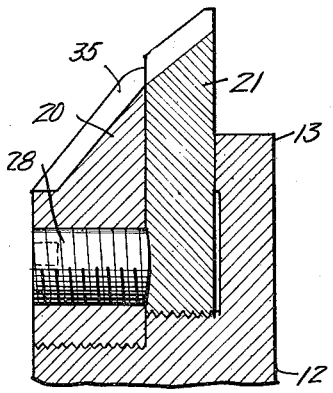
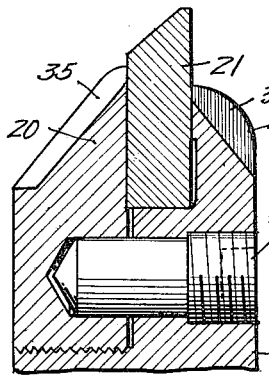
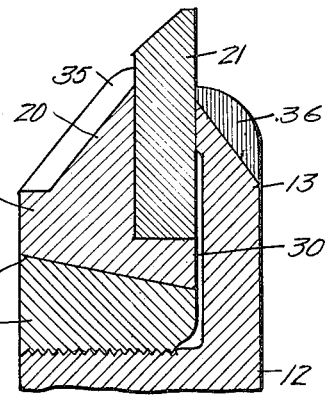
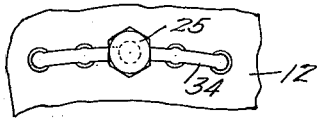

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

DEMOUNTABLE CUTTING EDGE FOR DRILLING-TOOLS.

1,143,275.   Specification of Letters Patent.   Patented June 15, 1915.

Application filed May 2, 1914. Serial No. 835,850.

*To all whom it may concern:*

Be it known that I, HOWARD R. HUGHES, a citizen of the United States, residing at Houston, in the county of Harris, State of Texas, have invented new and useful Improvements in Demountable Cutting Edges for Drilling-Tools, of which the following is a specification.

This invention relates to rotary boring drills of the type in which the cutters consist of substantially disk-shaped rotatable members provided with sharp cutting edges that shear off the material from the side of the hole and having crushing portions that disintegrate the material on the bottom of the hole lying at one side of the zone where the sharp edges of the cutters dig into the bottom of the hole.

One object of my present invention is to provide a cutter of the general type mentioned, in which the sharp cutting edge is formed on a removable member or portion of the cutter.

Another object is to provide a cutter of the general type mentioned, in which the crushing portion is formed on a removable member or portion of the cutter.

Another object is to provide a cutter of the general type mentioned, in which both portions of the cutter, namely, the sharp shearing edge and the crushing portion, can be renewed or replaced when either of said parts become dull or worn.

Another object is to provide a cutter of the construction above described, in which the removable portions of the cutter can be taken off and replaced without removing the cutter from its support. And still another object is to provide a drill having a pair of oppositely inclined cutters that are equipped with demountable cutting edges and grinding portions or edges.

Other objects and desirable features of my invention will be hereinafter pointed out.

The invention is illustrated in the accompanying drawings, in which:

Figure 1 is a side elevation of a drilling tool fitted with cutters constructed in accordance with this invention. Fig. 2 is a side elevation of one of the cutters. Fig. 3 is a vertical section on the line 3—3 of Fig. 2 illustrating the preferred manner of mounting the cutting or shearing edge.

Figs. 4, 5, 6, 7, 8 and 9, inclusive, are details illustrating modified forms of the detachable mounting of the cutting edge. Fig. 10 is a detail in elevation, as seen on the line 10—10 of Fig. 5 in the direction indicated by the arrows, this view being on a reduced scale.

More specifically, 12 indicates the hub of the cutter, which is formed with an annular flange 13 on its rear edge and is designed to be revolubly mounted on a trunnion or spindle 14 secured to the head 15 of the drill; the spindle 14 being attached to the head 15 by a threaded connection to permit of its ready detachment and removal. The cutter is held in place on the spindle 14 between a pair of washers 16 and 17, the outermost washer being held against displacement by an annular flange 18 formed on the spindle 14 and comprising a head for the latter.

In the preferred form of the invention shown in Figs. 2 and 3, the hub 12 is formed with a smooth tapered portion 19 on its periphery adjacent its juncture with the flange 13 and is threaded on its outer portion to receive a jam-nut of frustoconical form constituting an annular grinding member 20 as will later appear.

The cutter is provided with a cutting or shearing blade 21 in the form of a ring having its outer periphery formed with a knife edge 22 and its inner edge beveled to conform to the tapered surface 19 on the hub 12. The blade 21 is positioned on the tapered portion 19 of the hub against the inner face of the flange 13 and is held thereagainst by means of the grinding member 20 which is screwed on the hub 12 and caused to bear against the blade 21 to crowd the latter against the flange 13. The grinding member 20 is held against displacement by set screws 23 which are screwed therethrough and caused to bear against the outer face of the blade 21, thereby jamming the latter on the beveled face 19 and effectively locking the grinding member and blade against movement in relation to each other and to the hub 12.

In the modified form of the invention shown in Fig. 4, the grinding member 20 slips on the hub 12 and is secured thereto by means of bolts 24, which pass through the flange 13 and are threaded into the grinding member in such manner as to clamp the blade 21 against the flange 13.

In the modification shown in Fig. 5, the grinding member 20 is threaded on the hub 12 and is locked against movement thereon by means of a bolt 25 passing through the flange 13 and engaging the grinding member. To permit of the ready introduction of the bolt 25 into the threaded apertures in the member 20 the flange 13 is formed with an arcuate slot 34 through which the shank of the bolt 25 extends.

In the modification shown in Fig. 6, the grinding member 20 and the blade 21 slip over the hub 12 and are secured in place by bolts 26, which pass through the flange 13 and through perforations 27 in the blade 21 and are threaded in the member 20 in such manner as to clamp the blade 21 between the member 20 and the flange 13; the blade being held against rotation by the bolts 26.

In the modification shown in Fig. 7, the blade 21 is screwed on the hub 12 against the flange 13 and the grinding member 20 is also screwed on the hub 12 to abut against the outer face of the cutting blade to lock it in place; the grinding member and blade being further locked against movement in relation to each other by means of a set screw 28, which is threaded in the member 20 and bears against the cutting blade.

In the modification shown in Fig. 8, a construction corresponding to that shown in Fig. 5 is employed, excepting that the grinding member 20 is engaged by means of a counter-sunk set screw 29 screwed in the flange 13 and having its inner end engaging the grinding member.

In the modification shown in Fig. 9, the blade 21 is carried upon a flange 30 formed on a ring 31 having an inclined inner wall 32; this ring 31 being held in position on the hub 12 by means of a ring 33 which is screwed on the hub 12 and is formed with a beveled outer periphery adapted to engage the inner periphery of the ring 32 to crowd the latter against the blade 21 and clamp the blade against the flange 13.

The tapered outer periphery of the grinding member 20 is formed with serrations or teeth 35, and serrations 36 are preferably formed on the outer periphery of the flange 13. The serrations 35 and 36 of the grinding member 20 and flange 13 serve to break up and crush the materials severed and loosened by the cutting blade 21 when the drill is in operation. This operation is effected by the rotation of the drill head 15, which, in revolving, carries the cutters therewith; the cutting blades severing the materials at the sides and end of the bore, and the grinding member 20 coöperating with the serrated flange 13 to crush the materials thus loosened so as to reduce the work of the cutting edge in passing through the loosened materials and thus facilitating the drilling operations.

What I claim is:

1. A drill, comprising a head that is adapted to be connected to a drill stem, a revoluble member on the head, an annular blade carried on said member, and means for detachably connecting said blade to the revoluble member, including a frustoconical member having a roughened portion on its tapered periphery that coöperates with the blade to disintegrate the material in which the hole is being formed.

2. A rotary cutter for boring drills consisting of a hub provided with an annular flange, an annular blade surrounding the hub, and means for detachably clamping said blade against said flange, said means consisting of a grinding member provided on its exterior with a roughened surface that coöperates with the blade to disintegrate the material in which the hole is being formed.

3. In a drilling tool, the combination with a head, a trunnion thereon, a cutter member revolubly mounted on said trunnion, an annular blade supported on said cutter member, and means for detachably connecting said blade to the cutter member, comprising an annular member formed with a serrated periphery which constitutes a crushing surface that disintegrates the material on the bottom of the hole.

4. In a drilling tool, the combination with a head, of a trunnion detachably mounted thereon, a rotary cutting member on said trunnion having a hub portion with an annular flange formed thereon, a blade encompassing the hub, a member for crowding the blade against the flange, and means for locking the member and blade against displacement, said member having a tapered periphery formed with grinding serrations.

5. In a drilling tool, the combination with a head, of a trunnion detachably mounted thereon, a rotary cutting member on said trunnion having a hub portion with an annular flange formed thereon, a blade encompassing the hub, a member for crowding the blade against the flange, and means for locking the member and blade against displacement, said member and flange formed with serrations on their peripheral edges.

6. A cutter for rotary boring drills comprising a hub, a removable cutting blade thereon, and an annular grinding member arranged adjacent the blade and provided on its exterior with a roughened surface that coöperates with the blade to disintegrate the material in which the hole is being formed.

7. A cutter for rotary boring drills comprising a hub, a removable annular cutting blade mounted on the hub, and a removable annular grinding member mounted on the hub at one side of said blade and provided on its periphery with a roughened surface that coöperates with the blade to disintegrate the material in which the hole is being formed.

8. A cutter for rotary boring drills comprising a hub, a removable annular cutting blade mounted on the hub, a removable annular grinding member arranged on the hub adjacent said blade and provided on its periphery with a roughened surface that coöperates with the blade to disintegrate the material in which the hole is being formed, and means for securely retaining said blade and grinding member in operative position on the hub.

9. A cutting disk for drills, comprising a hub having a flange, an annular blade on the hub adjacent the flange, and a removable grinding member adjacent the blade on the side thereof opposite the flange that is provided with a roughened surface which coöperates with said blade to disintegrate the material in which the hole is being formed.

10. A cutter for drills, comprising a hub having an annular flange formed with a serrated edge, an annular cutting blade arranged adjacent the flange, and a grinding member adjacent the blade on the side opposite the flange.

11. A cutter for drills, comprising a hub having an annular flange formed with a serrated edge, an annular cutting blade arranged adjacent the flange, and a grinding member adjacent the blade on the side opposite the flange, said grinding member comprising a ring formed with a serrated peripheral edge.

12. A cutter for drills, comprising a hub having an annular flange, formed with a serrated edge, an annular cutting blade arranged adjacent the flange, and a grinding member adjacent the blade on the opposite side of the flange, comprising a frustoconical ring having a serrated peripheral edge.

13. A drill, comprising a head, a revoluble member on the head, an annular blade carried on said member, and means for detachably connecting said blade to the revoluble member, including a frustoconical member that has a roughened surface on its tapered periphery that constitutes a grinding portion.

14. In a drilling tool, the combination with a head, of a trunnion detachably mounted thereon, a rotary cutting member on said trunnion having a hub portion with an annular flange formed thereon, a blade encompassing the hub, and a member for crowding the blade against the flange, and means for locking the member and blade against displacement, said member having a tapered periphery formed with grinding serrations.

15. A cutter for rotary boring drills consisting of a substantially disk-shaped member provided with a demountable cutting edge and also having a crushing portion, said cutter being adapted to be arranged in such a manner that said cutting edge shears off the material from the side wall of the hole and said crushing portion disintegrates the material on the bottom of the hole lying at one side of the zone where said cutting edge acts on the bottom of the hole.

16. A cutter for rotary boring drills consisting of a substantially disk-shaped member provided with a sharp edge and also having a removable crushing portion, said cutter being adapted to be arranged in such a manner when it is in service that said sharp edge shears off the material from the side wall of the hole and said crushing portion disintegrates the material on the bottom of the hole lying outside of the cutting zone of said sharp edge.

17. A cutter for rotary boring drills provided with a removable shearing portion and also having a removable crushing portion, said cutter being intended to be arranged in such a position that when it is in service said shearing portion will act on the side wall of the hole being formed and said crushing portion will disintegrate the material on the bottom of the hole lying at one side of the zone where said shearing portion acts on the bottom of the hole.

18. A cutter for rotary boring drills provided with a demountable cutting edge and also having two crushing portions arranged on opposite sides of said cutting edge, said cutter being adapted to be arranged in such a manner that said cutting edge will shear off the material from the side wall of the hole and said crushing portions will disintegrate the material on the bottom of the hole.

19. A cutter for rotary boring drills provided with a demountable cutting edge and also having two crushing portions provided with roughened surfaces arranged on opposite sides of said cutting edge, one of said crushing portions being removable.

20. A cutter for rotary boring drills having a hub that is provided with a tapered portion, an annular shaped blade on said hub, and means for forcing said blade onto the tapered portion of the hub.

21. A cutter for rotary boring drills having a hub that is provided with a tapered portion, an annular shaped blade on said hub, means for forcing said blade onto the tapered portion of the hub, and an abutment on said hub against which one side of said blade bears.

22. A rotary boring drill consisting of a head, and a rotatable cutter on said head arranged in such a manner that the lower portion of same inclines inwardly toward the longitudinal axis of the head, said cutter comprising a removable blade that shears off the material from the side wall of the hole, and a retaining device for said blade having a roughened surface that acts on the material at the bottom of the hole.

23. A rotary boring drill consisting of a head, a rotatable cutter on said head arranged in such a manner that the lower portion of same inclines inwardly toward the longitudinal axis of the head, and a removable portion on said cutter that shears off the material from the side wall of the hole, said cutter also having a crushing portion which lies outside of or beyond said shearing portion.

24. A rotary boring drill consisting of a head provided with substantially disk-shaped cutters arranged in such a manner that the lower portions of same incline inwardly toward the vertical axis of the drill head, said cutters having removable shearing edges that remove the material from the side wall of the hole, and removable crushing portions that disintegrate the material on the bottom of the hole lying outside of the zone where said shearing edges act on the bottom of the hole.

In witness that I claim the foregoing I have hereunto subscribed my name this 25th day of April, 1914.

HOWARD R. HUGHES.

Witnesses:
MARGUERITE BATES,
MARIE BATTEY.

Copies of this patent may be obtained for five cents each, by addressing the "Commissioner of Patents, Washington, D. C."